A. SHUMAN.
MANUFACTURE OF GLASS.
APPLICATION FILED APR. 23, 1915.
1,207,643.
Patented Dec. 5, 1916.
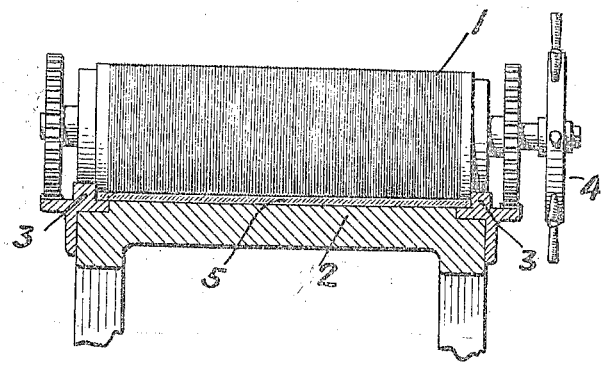
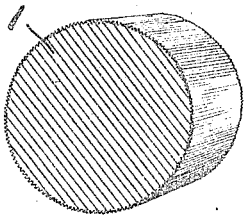
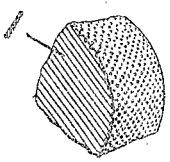
WITNESS:
INVENTOR
Arno Shuman
BY
Augustus B Stoughton
ATTORNEY.

UNITED STATES PATENT OFFICE.

ARNO SHUMAN, OF PHILADELPHIA, PENNSYLVANIA, ASSIGNOR TO PENNSYLVANIA WIRE GLASS COMPANY, OF PHILADELPHIA, PENNSYLVANIA, A CORPORATION OF NEW JERSEY.

MANUFACTURE OF GLASS.

1,207,643.    Specification of Letters Patent.    Patented Dec. 5, 1916.

Application filed April 23, 1915. Serial No. 23,303.

*To all whom it may concern:*

Be it known that I, ARNO SHUMAN, a citizen of the United States, and a resident of Philadelphia, in the county of Philadelphia and State of Pennsylvania, have invented certain new and useful Improvements in the Manufacture of Glass, of which the following is a specification.

The principal object of the present invention is to provide an extremely smooth, flat and therefore attractive top surface upon a rolled sheet of glass; and this I do by rolling the glass while hot and fluid with a vented roller which admits air back of the roller and between it and the glass, so that the surface of the glass is not lifted by the roller but remains flat and any ridges or marks formed in the fluid surface of the glass by the vents of the roller are so small that they flatten out before the glass has had time to cool.

When glass is rolled with an ordinary smooth and practically polished roller, there are longitudinal raised ridges of extremely small height produced which makes the surface of the glass look less attractive than if the surface of the glass was entirely flat and polished. Moreover such glass does not cut quite as well as perfectly flat and polished glass would. These very slight longitudinal ridges are caused by the fact that when the center of the smooth roll has passed over a certain portion of the sheet there is a slight vacuum formed back of the roll, which tends to lift the glass, and then when the glass subsides again, due to its weight, it does not subside equally, but leaves the ridges.

My invention will be described in connection with the accompanying drawings, in which—

Figure 1, is a transverse sectional view, and Figs. 2 and 3 are detached views illustrating modifications.

The surface of the roller 1 is provided with vents. The vents may consist of fine annular ribs, as shown in Fig. 1, or longitudinal ribs as shown in Fig. 2, or of slight depressions arranged close together as shown in Fig. 3, or more generally, the smooth surface of the roller is broken up to a sufficient degree to let air in at the bottom of the depressions as the roller passes over the glass thus preventing any vacuum action between the two surfaces which would tend to lift the glass. For the sake of description, but without confining the invention thereto, the ribs may be twenty to thirty to the inch and they can be made at any reasonable angle, as from twenty to sixty degrees.

2 is a table shown as provided with trangs 3 and provisions 4 for operating the roller. In use a sheet of glass 5 is rolled by means of this roller 1 in the ordinary manner. When the vented roller passes over the glass which is hot and fluid the vents allow the air to get in between the glass and the roller so that the roller does not lift by vacuum or like action any of the glass but the glass remains as it should flat on the table. As the roller passes over the glass the small markings or irregularities formed in the glass by the roller quickly flatten out by the action of gravity on the fluid glass before the surface of the glass has time to cool and thus an absolutely flat fluid or liquid surface results. If the glass is not hot enough and consequently not fluid enough, the small ribs or markings will flatten out more or less imperfectly according to the coldness of the glass and the result would be a more or less imperfectly ribbed surface which would spoil and prevent the attainment of the object of the present invention, so that it is important that the glass be sufficiently hot to possess the required fluidity.

It might be said that the invention is based upon the theory or fact that melted glass is a liquid incapable of wetting iron or steel and the like and the same kind of a depressed meniscus is formed by pressing anything into the glass, such as the small projections on the roller, as is formed when an object is pressed into mercury, so that when the projections, ribs or parts that make the vents contact with the hot and fluid glass the glass never presses entirely down into the bottom of the vents in the roller so that air can get in between the glass and the roller through these minute openings which are left at the bottom of the vents.

I am aware that ribbed rolls and rolls having ornamentations have been used for a long time for rolling glass but they have been used for the purpose of producing in the face of the glass whatever ribs or ornamentations were impressed in the roll and such rolls were always used with glass sufficiently cool to prevent the ribs or ornamentations from flattening out after the roll had passed, because that would spoil or defeat the object for which the roll was designed, which object as has been stated was to reproduce the ridges or ornamentations in the finished article. Contrasted with this, it is the spirit of the present invention that every impression or marking made by the roll be entirely obliterated or else the object of the invention would be defeated.

It will be obvious to those skilled in the art to which the present invention relates that modifications may be made in details of construction and procedure, hence the invention is not limited as to those matters or in any way further than the prior state of the art and the appended claims may require.

What I claim is:

1. The method of producing sheet glass having a flat upper surface, which consists in rolling the glass into a sheet and maintaining portions of the surfaces of the sheet and roller out of contact to air vent the surfaces and permit the glass to remain flat on the table, and maintaining the temperature of the sheet after rolling sufficiently high to permit any ridges or marks formed by the air venting to subside or flatten by the action of gravity before the glass solidifies, substantially as described.

2. Apparatus for producing sheet glass having a flat upper surface which comprises the combination of a table and a roller having its surface provided with minute cavities constituting vents and of such depth and extent that glass will not entirely fill them during the rolling operation, substantially as described.

3. Apparatus for producing sheet glass having a flat upper surface which comprises the combination of a table and a roller having its active surface impressed with annular ribs or corrugations constituting vents and of such a degree of fineness that the glass will not entirely fill the grooves during the rolling operation, substantially as described.

In testimony whereof I have hereunto signed my name in the presence of two witnesses.

ARNO SHUMAN.

Witnesses:
D. C. EASON,
M. D. WILLIAMS.